United States Patent
Fellhauer et al.

(10) Patent No.: US 11,841,451 B2
(45) Date of Patent: Dec. 12, 2023

(54) COMMUNICATION DEVICE AND METHOD

(71) Applicant: Sony Corporation, Tokyo (JP)

(72) Inventors: Felix Fellhauer, Stuttgart (DE); Thomas Handte, Stuttgart (DE); Dana Ciochina, Stuttgart (DE); Nabil Sven Loghin, Stuttgart (DE)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 17/279,583

(22) PCT Filed: Nov. 15, 2019

(86) PCT No.: PCT/EP2019/081510
§ 371 (c)(1),
(2) Date: Mar. 25, 2021

(87) PCT Pub. No.: WO2020/099646
PCT Pub. Date: May 22, 2020

(65) Prior Publication Data
US 2021/0341565 A1 Nov. 4, 2021

(30) Foreign Application Priority Data
Nov. 16, 2018 (EP) .................................... 18206816

(51) Int. Cl.
G01S 5/02 (2010.01)
H04L 43/0864 (2022.01)
H04W 64/00 (2009.01)

(52) U.S. Cl.
CPC .......... *G01S 5/0273* (2013.01); *G01S 5/0215* (2013.01); *H04L 43/0864* (2013.01); *H04W 64/006* (2013.01)

(58) Field of Classification Search
CPC ..... H04W 72/04; H04W 72/12; H04W 28/06; H04W 72/0446; H04W 56/00;
(Continued)

(56) References Cited

U.S. PATENT DOCUMENTS

| 2015/0338512 A1 | 11/2015 | HomChaudhuri et al. |
| 2018/0131540 A1* | 5/2018 | Malik ................... H04L 25/022 |
| 2019/0129024 A1* | 5/2019 | Kasher ................... G01S 7/006 |

FOREIGN PATENT DOCUMENTS

| WO | 2008/088961 A1 | 7/2008 |
| WO | 2018/160141 A1 | 9/2018 |

OTHER PUBLICATIONS

International Search Report and Written Opinion dated Feb. 17, 2020, received for PCT Application PCT/EP2019/081510, Filed on Nov. 15, 2019, 10 pages.

* cited by examiner

*Primary Examiner* — Kwasi Karikari
(74) *Attorney, Agent, or Firm* — XSENSUS LLP

(57) ABSTRACT

A communication device for RF based communication with another communication device, said communication device comprising circuitry configured to apply a fine timing measurement, FTM, procedure. The circuitry is configured to determine an FTM mode out of at least two different FTM modes, and to perform an FTM procedure to determine the round trip time, RTT, between the communication device and the other communication device, wherein the RTT is determined by evaluating a time information of a tap of the channel impulse response, wherein the tap used for the evaluation depends on the determined FTM mode.

20 Claims, 13 Drawing Sheets

(58) Field of Classification Search
CPC ..... H04W 28/26; H04W 16/28; H04W 24/10; H04W 52/245; H04W 52/267; H04W 52/367; H04W 72/541
See application file for complete search history.

Fig. 10

| Bits: | 2 | 5 | 1 | 4 | 4 | 8 | 16 | 1 |
|---|---|---|---|---|---|---|---|---|
| | Status Indication | Value | Extension Present | Number of Bursts Exponent | Burst Duration | Min Delta FTM | Partial TSF Timer | Partial TSF Timer No Preference |
| | B0   B1 B2 | B6 | B7 | B8   B11 | B12   B15 | B16   B23 | B24   B39 | B40 |

| Bits: | 1 | 1 | 5 | 1 | 1 | 6 | 16 | 8 |
|---|---|---|---|---|---|---|---|---|
| | ASAP Capable | ASAP | FTMs per Burst | FTMs per Burst | Reserved | Format and Bandwidth | Burst Period | Extension Field |
| | B41 | B42 | B43   B47 | B48 | B49 | B50   B55 | B56   B71 | B72   B79 |

| Category | Public Action | Trigger | LCI Measurement Request (optional) | Location Civic Measurement Request (optional) | Fine Timing Measurement Parameters (optional) | Ranging Parameters (optional) |
|---|---|---|---|---|---|---|
| 1 | 1 | 1 | variable | variable | variable | variable |

Octets:

Fig. 15

COMMUNICATION DEVICE AND METHOD

CROSS-REFERENCE TO RELATED APPLICATIONS

The present application is based on PCT filing PCT/EP2019/081510, filed Nov. 15, 2019, which claims priority to EP 18206816.3, filed on Nov. 16, 2018, the entire contents of each are incorporated herein by reference.

BACKGROUND

Field of the Disclosure

The present disclosure relates to a communication device and method, which may be used for estimating the position of the communication device.

Description of Related Art

Positioning and localization in indoor scenarios is still a challenge as satellite based systems like GLONASS or Global Positioning System (GPS) cannot penetrate concrete walls of typical buildings. To overcome this restriction, various approaches have been evaluated. Besides the concept of using dedicated infrastructure like anchors or beacons that transmit acoustic, optical or electromagnetic signals, it has been considered to exploit systems that have not been built for the purpose of indoor localization. An early candidate has been WLAN infrastructure that is deployed in many indoor scenarios anyways.

Known methods rely on using Received Signal Strength Indicator (RSSI), either for fingerprinting which requires a priori knowledge in terms of elaborate mapping, or for deriving the distance by assuming a path loss model. The Fine Timing Measurement (FTM) protocol to accurately measure and exchange information on time of arrival and time of departure (TOA and TOD) of radio signals, which further allows to systematically derive the Round Trip Time (RTT) and implicitly the Time of Flight (TOF) of data packets, has been developed in IEEE 802.11-2016, which is herein incorporated by reference. From the TOF, the corresponding distance between two devices can be computed using the speed of light in the communication medium (e.g., free space). In a second step, based on the TOF measurements with several anchor positions (e.g., access points, APs), reliable positioning can be achieved by trilateration.

The upcoming standard for indoor localization IEEE 802.11az using WLAN infrastructure will be a first step towards interoperability of TOF based positioning approaches and their wide spread availability of indoor localization. Besides this, development of communication standards, leaping towards higher data rates, will make huge bandwidths available that are mostly unused in the unlicensed mmWave spectrum, such as IEEE 802.11ay which operates in the 60 GHz band.

Upcoming standards like IEEE 802.11ay are targeting data rates of up to 28 Gb/s or even higher. Physical characteristics like huge path loss, blockage and spatial sparsity of these channels make it necessary to use novel approaches in order to establish reliable communications. One of these new concepts is the usage of Phased Array Antennas (PAAs), which increase the antenna gain, allow dynamic adaption to the channel and therefore counteract the huge path loss and angular sparsity of mmWave channels.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a communication device that enables the measurement of time of flight information not only for a line of sight (LOS) path between the communication device (e.g. an initiator) and another communication device (e.g. a responder) but also for one or more other paths between them, which may then be used for estimating the position of the communication device more reliably, particularly in indoor scenarios. It is a further object to provide a corresponding communication method and as well as a corresponding computer program and a non-transitory computer-readable recording medium for implementing said method.

According to an aspect of the present disclosure there is provided a communication device for RF based communication with another communication device, said communication device comprising circuitry configured to apply a fine timing measurement, FTM, procedure, wherein the circuitry is configured to determining an FTM mode out of at least two different FTM modes, performing an FTM procedure to determine the round trip time, RTT, between the communication device and the other communication device, wherein the RTT is determined by evaluating a time information of a tap of the channel impulse response, wherein the tap used for the evaluation depends on the determined FTM mode.

According to another aspect of the present disclosure there is provided a communication device for RF based communication with another communication device, said communication device comprising circuitry configured to determine a time of flight of RF signals exchanged with the other communication device via two or more paths, wherein the circuitry is configured to select a first path of said two or more paths by determining the first tap among the taps of the channel impulse responses of said two or more paths and select the path corresponding to the first tap as the first path, obtain the time of flight for said first path, select a second path of said two or more paths by determining another tap among the taps of the channel impulse responses of said two or more paths, wherein the other tap is different from said first tap, and select the path corresponding to the other tap as the second path, and obtain the time of flight for said second path.

According to still further aspects corresponding communication methods, a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed position estimation device and as defined in the dependent claims and/or disclosed herein.

One of the aspects of the disclosure is to provide an extension of the protocol for Fine Timing Measurement (FTM), which is used to measure the distance between communication devices using radio frequency (RF) signals. Conventionally, the FTM procedure is applied to the so-called first path (using the terminology of the upcoming standard IEEE802.11ay) only (which is normally the LOS path or, in case of an obstacle in the LOS path, the obstructed LOS (O-LOS) path).

An aspect of the present disclosure enables performing the FTM procedure for multiple (at least two) different paths. This may allow the estimation of time information for multiple (at least two) different paths, each with a specific distance between two communication devices. In one embodiment, the FTM procedures for different paths are performed using different antenna weight vectors during transmit and receive operations, i.e., steering the beams to different spatial directions. The obtained multipath information can be used to improve the reliability of position estimation and localization of a communication device, particularly if no reference is available, as will be described below.

One aspect of the present disclosure relates to the selection of a particular FTM mode. The FTM mode may determine the FTM procedure or a parameter set to be used for the FTM procedure. Particularly, the FTM mode determines which tap of the channel impulse response shall be used for determining the RTT. This may allow, for example, obtaining valid and accurate measurements in situations with problematic LOS path conditions (O-LOS or non-LOS (NLOS) conditions). Under such conditions, e.g., where an obstacle is blocking the LOS path, conventional application of the FTM procedure may yield poor RTT. Also, angular estimations for obtaining angle of departure (AOD) and angle of arrival (AOA) may be prone to such problematic conditions.

Another aspect of the present disclosure presents a procedure and protocol for measuring TOF for a second (i.e., other than the first) signal path (where the first signal path may be the LOS path or an O-LOS path), which enables to determine the length of multiple propagation paths between a first communication device (e.g. an initiator or sender or a station (STA)) and a second communication device (e.g. a responder or a receiver or an access point (AP)). Hence, a valid positioning is possible not only in LOS but also in (NLOS) situations featuring reflections and multiple propagation paths. In the presence of a LOS or O-LOS path, positioning accuracy can further be improved by including the observations about the NLOS path.

The disclosed approach considers NLOS paths that interconnect transmitter and receiver via one scatterer/reflector only. Information about such NLOS paths, such as RTT and angular estimates, can increase positioning accuracy by providing additional information. Even in the extreme case where no LOS component is present, positioning may be feasible if a sufficient number of (at least two) NLOS paths can be observed.

The disclosed approach can be implemented for scenarios including a Line-of-Sight (LOS) one or more non-LOS (NLOS) paths. In contrast to other methods, aspects of the disclosure can even provide location information in situations where no global angular reference (e.g., geographical north for azimuth information and horizon for elevation information) and/or no Line-of-Sight is available. Moreover, the disclosed approach can be applied for SISO (Single Input Single Output) systems employing a single phased array antenna (PAA) per participant and further enhanced to Hybrid MIMO systems that employ multiple PAAs on both sides.

The term "communication device" as used herein shall be understood broadly, including devices which transmit only static beacons. An anchor point, e.g., may not transmit any information in the sense of data communication, but may transmit continuously, periodically or at certain times a known preamble sequence or a beacon signal which can be used for positioning.

According to preferred embodiments multiple properties of arriving/departing RF signals may be acquired and used jointly in order to derive accurate position information. Particularly in communication systems that use the mmWave spectrum from 3 to 300 GHz, respective propagation characteristics allow for accurate estimation of angle of arrival (AOA) and angle of departure (AOD) of a RF signal with respect to the two communication devices. The term direction of arrival/departure is used when both angles (azimuth and elevation) are combined to describe a unique direction in the three-dimensional space.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 10 shows a table illustrating an embodiment of signaling of a strongest tap mode in the FTM Parameters field;

FIG. 15 shows a table illustrating another embodiment of signaling.

DETAILED DESCRIPTION OF THE EMBODIMENTS

Figure 1A:
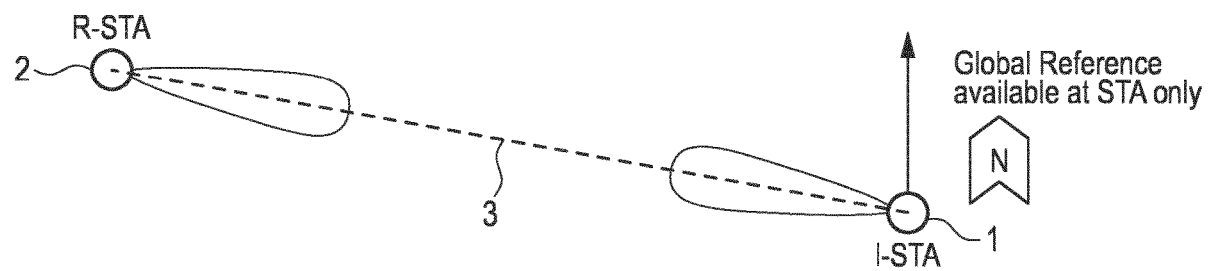
FIG. 1 shows a diagram illustrating a LOS scenario with a single propagation path.

Referring now to the drawings, wherein like reference numerals designate identical or corresponding parts throughout the several views, FIG. 1 shows a diagram illustrating a LOS scenario. As shown in FIG. 1A a single propagation path 3 exists between a first communication apparatus 1 (e.g. an initiating station (or simply initiator), I-STA, or a station) and a second communication apparatus 2 (e.g. a responder station (or simply responder), R-STA, or an access point). In a LOS only situation there exists only a single option to perform optimum analog beamforming. Independent from the used metric (i.e. total power, rate, SNR, etc.), all relevant metrics are maximized when both STA choose their antenna gain pattern (or antenna weight vector (AWV)) such that they are aligned to the LOS path.

Figure 1B:
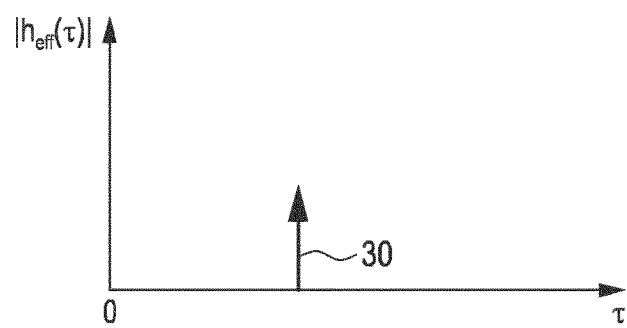

When a Fine Timing Measurement (FTM) procedure is performed, the length of the path 3 between the I-STA 1 and the R-STA 2 can be calculated by estimating the TOA of the channel tap belonging to the LOS path indicated by the arrow 30 (Dirac impulse) in the channel impulse response (CIR) plot depicted in FIG. 1B showing the signal strength $|h_{\it{eff}}(\tau)|$ over the delay $\tau$ between the I-STA 1 and the R-STA 2. The CIR can be estimated at the receiving device from analyzing the transmitted training sequence. In order to localize the R-STA 2 with respect to the I-STA 1, further information about the angular property of the propagation is required. This information can be obtained by evaluation of the AWV selected by the I-STA 1 and (if present) a global reference direction such as geographic North for azimuth and the geographic horizon for the elevation. In particular, from the TOF, the corresponding distance between two devices 1 and 2 can be computed using the speed of light in the communication medium (e.g., free space). In a second step, based on the TOF measurements with several anchor positions (e.g., access points, APs), reliable positioning can be achieved by trilateration. Alternatively, only one TOF measurement derived from a single anchor point may be sufficient for positioning if angular information such as direction of arrival (DOA) and/or direction of departure (DOD) can be estimated. The term "direction" is to be understood to summarize both angles in three-dimensional space, i.e., azimuth and elevation angle.

A CIR can be estimated either from a known signal in time domain in a single carrier system or from known subcarriers in a multicarrier system. In single carrier systems, such as described in the upcoming standard IEEE 802.11ay, a Golay sequence may be transmitted, which exhibits good correlation properties. When the received signal (which reflects noisy multipath propagation) is correlated with the known Golay sequence (and after proper normalization, if needed), the CIR is obtained. In a multicarrier system, e.g., OFDM-based 802.11n/ac, known subcarriers (pilots) are inserted in the frequency domain. After equalizing the received signal, an inverse Fourier transformation transforms the frequency response of the channel to the CIR.

The true (omnidirectional) CIR may be difficult to estimate for mmWave signals, since transmission and reception is typically directed in narrow beams via beamforming. Using a certain beamforming constellation (at transmitter and receiver side) will result in an effective CIR, seen only for this constellation.

As a side effect, the usage of PAAs allows to estimate channel properties (like DOA and DOD) very accurately (e.g., by investigating phase differences of the RF wave front at different elements of the PAA). These channel properties can be exploited in order to deliver positioning information in LOS situations with only one communication link (while trilateration requires at least three links).

Figure 2A:
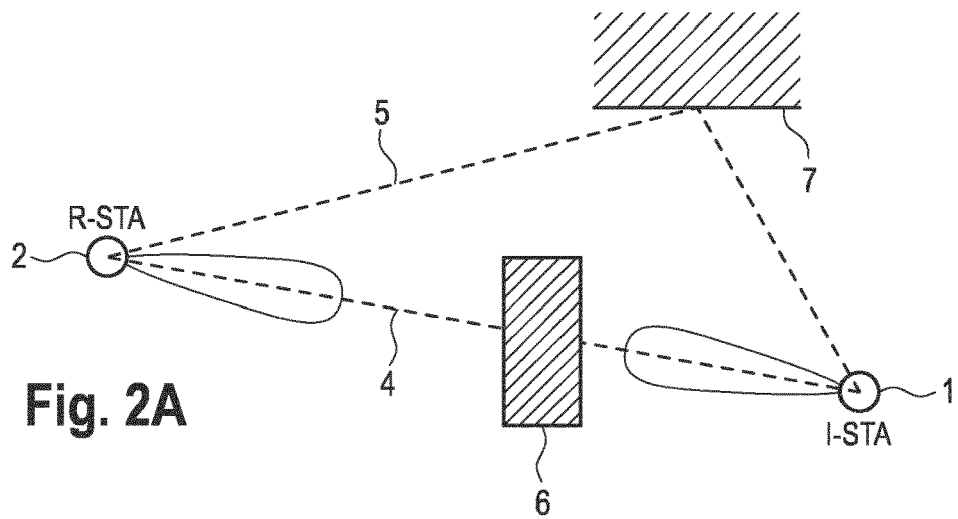
FIG. 2 shows a diagram illustrating a NLOS scenario with two propagation paths.

In indoor scenarios, where reflections of paths on scatterers/reflectors exist, multipath propagation occurs. The present disclosure is of particular interest in cases where the LOS path is obstructed by an obstacle (obstructed LOS, O-LOS), in which case the LOS-only path will result in degraded estimations of TOF and DOA/DOD due to the weak signal levels. In many scenarios (particularly indoor scenarios where many reflected paths are available) there is more than a single path present interconnecting two communication devices. If the direct path is obstructed the respective tap in the CIR is weakened, and more prone to noisy observations. Such a scenario is shown in FIG. 2. In this specific situation there are two paths 4, 5 present between the I-STA 1 and the R-STA 2: Path 4 corresponds to the obstructed LOS path (obstructed by obstacle 6) and path 5 is reflected by a scatterer/reflector 7 (resulting in a NLOS path), as shown in FIGS. 2A and 2C.

For the purpose of data transmission, beamforming may be conducted by selecting AWVs that focus on the reflected path 5, because the power $|h_{\it{eff}}(\tau)|$ (or more precisely $|h_{\it{eff}}(\tau)|^2$) of the obstructed path 4 (indicated in the CIR depicted in FIG. 2D by the arrow 40) is lower than the power of the reflected path 5 (indicated in the CIR depicted in FIG. 2D by the arrow 50), even if focused by beamforming. Therefore, conventional beamforming for data communication will either result in the scenario shown in FIGS. 2A and 2C (if dominant LOS path) and FIGS. 2B and 2D (if dominant NLOS path). This might be ideal for data communication, as it maximizes the received signal strength and therefore the theoretically achievable data rate.

On the other hand, for the purpose of localization it would be the best choice to select AWVs that focus on the O-LOS beam path 4, independent on the power of the first CIR tap. By using this path 4 for beamforming, position estimation can be done by estimating a single angle of arrival/departure (AOA/AOD) and a single TOF for the O-LOS path 4. This situation is depicted in FIGS. 2A and 2C.

Figure 2B:
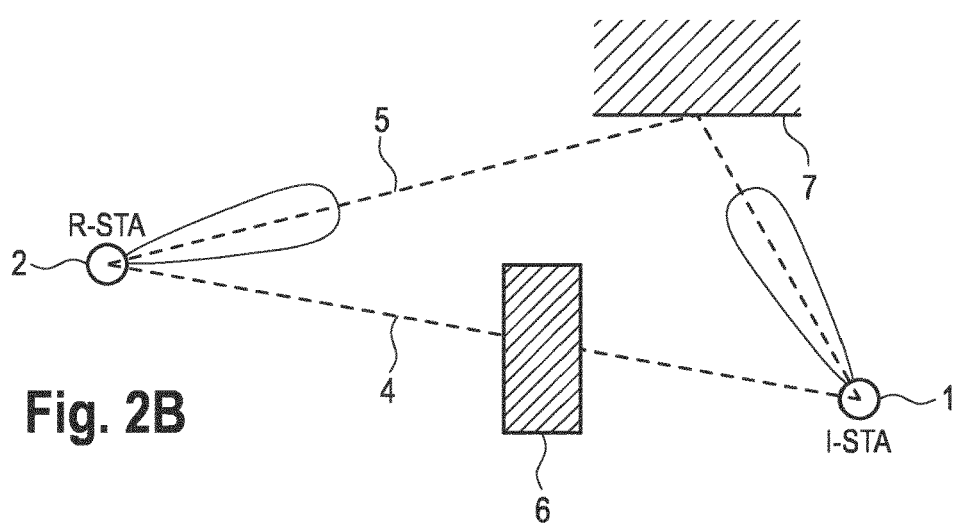
Figure 2C:
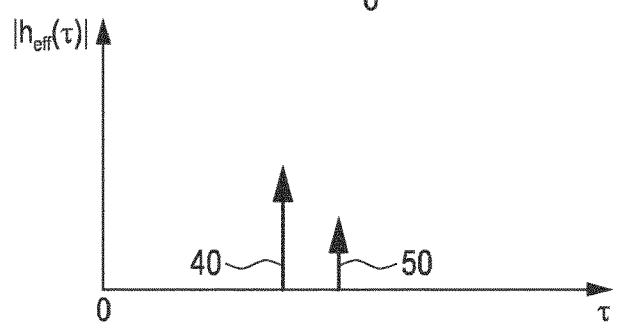
Figure 2D:
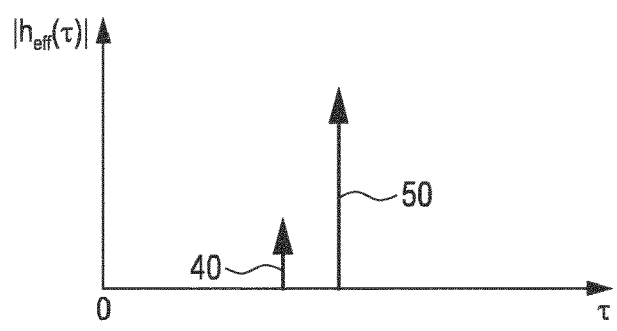

One of the problems addressed by the present disclosure corresponds to the situation depicted in FIGS. 2B and 2D in which the TOF of the NLOS path 5 shall be obtained.

Figure 3A:
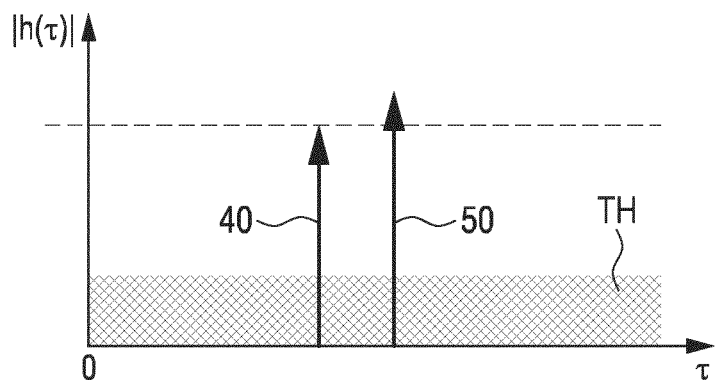
FIG. 3 shows a diagram of the CIR for three different scenarios.
Figure 3B:
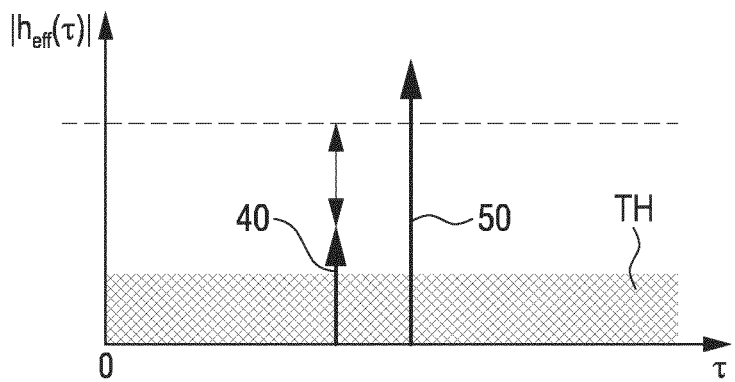
Figure 3C:
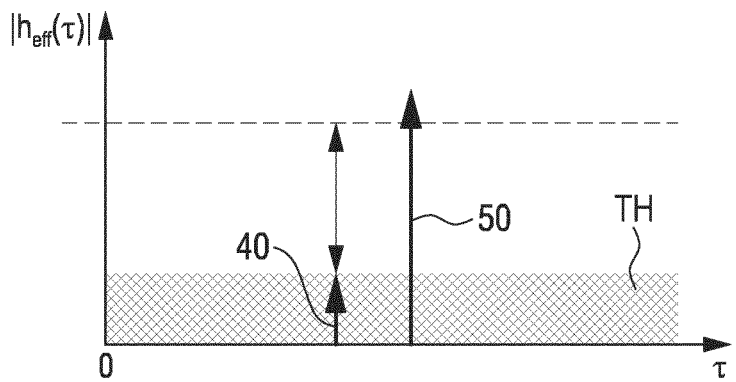

Therefore, a dedicated beamforming may be performed in order to focus on the NLOS path 5, as is currently possible according to the IEEE 802.11ay specification draft. As visualized in FIG. 3 showing a diagram of the CIR for two different scenarios, after beamforming the O-LOS path 4 can still be the first tap 40 in the CIR (FIG. 3A showing a scenario without beamforming, reflecting the true/omnidirectional channel; the dotted line R indicating the tap amplitude without beamforming as a reference) resulting in a wrong TOA, if TOA is measured with respect to the first tap. Only in the situation shown in FIG. 3C, if the O-LOS tap 40 can be suppressed below a sensitivity threshold TH, a valid TOA measurement is possible with currently defined measures (which focus on first path measurements). To perform a TOA measurement on the desired NLOS path 5, even in a situation shown in FIG. 3B (showing a scenario with beamforming with the O-LOS path 4 suppressed above the sensitivity threshold TH), solutions will be presented according to the present disclosure as explained in detail below.

In the 60 GHz frequency domain, usually analog beamforming is required in order to overcome the strong attenuation of radio signals by free-space path loss. Therefore electronically steerable antennas are used, such as PAAs. The focus direction of these antennas can technically be influenced by AWVs that weight the transmitted or received signals of multiple sub antennas in a way that they interfere constructively or destructively, depending on angle of incidence (arrival) or angle of departure. This interference then is usually only constructive for a distinct spatial direction. For other directions the signals interfere destructively. This results in a spatial directivity of such antenna arrays. In the state of the art, there are already two purposes of beamforming that can be distinguished: i) beamforming for the purpose of positioning, using the LOS (or O-LOS) path called "First Path Beamforming" and ii) beamforming for the purpose of communication called "Best Path Beamforming" (for communication).

Figure 4A:
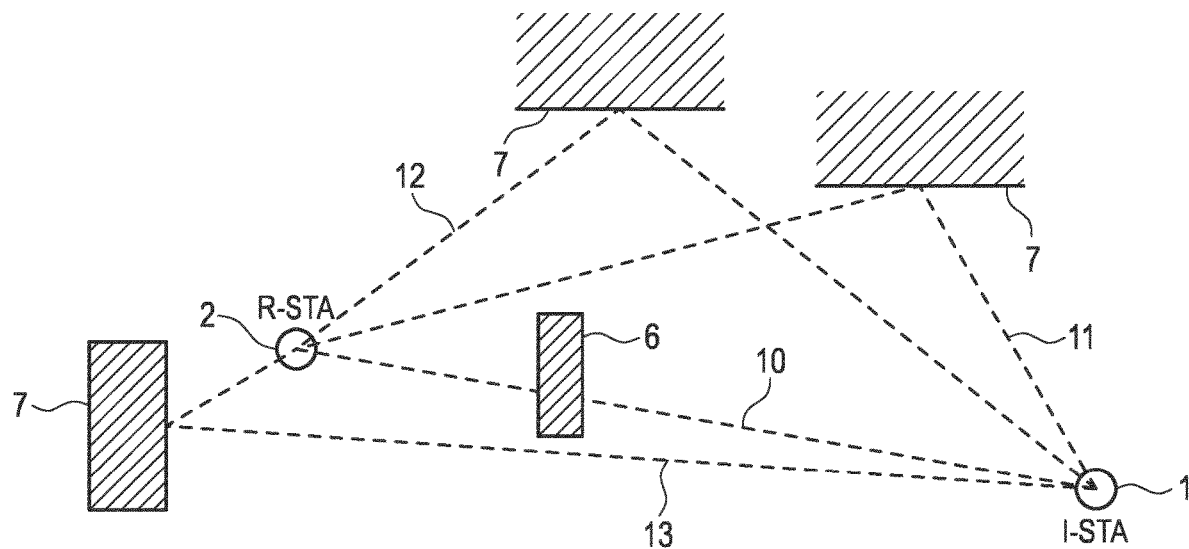
FIG. 4 shows a diagram illustrating a NLOS scenario with four propagation paths.
Figure 4B:
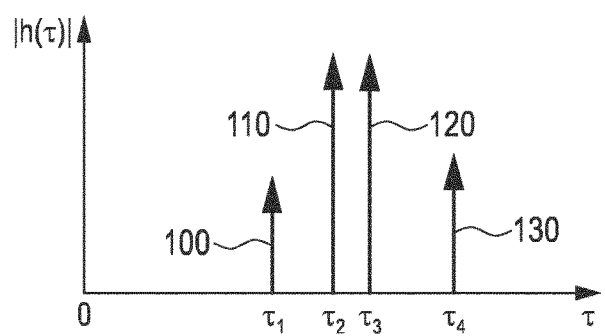

Fine Timing Measurement (FTM) is performed to determine the Round Trip Time (RTT) of a data packet between an I-STA and an R-STA. FIG. 4 shows a scenario with four distinct propagation paths, wherein FIG. 4A shows the four propagation paths 10, 11, 12 and 13 between the I-STA 1 and the R-STA 2 and wherein FIG. 4B shows the omnidirectional CIR with the corresponding taps 100 (for path 10, being the O-LOS path), 110 (for path 11, resulting potentially in the strongest signal for maximum throughput), 120 (for path 12) and 130 (for path 13) obtained without beamforming. In such scenarios the RTT can be defined in multiple ways. More specifically, each propagation path corresponds to its own TOF. Existing methods implicitly investigate the shortest path only, i.e. measuring the shortest RTT, i.e., first path FTM.

According to an aspect of the present disclosure this approach is extended in order to systematically evaluate other RTTs than the shortest one. Therefore, the spatial filtering properties of PAA antennas and respective AWVs can be taken as an advantage.

When beamforming is applied for the scenario shown in FIG. 4, selected AWVs can be applied on both sides (i.e. I-STA and R-STA), resulting in spatial filtering of the respective CIR:

$$h(\tau, AoA, AoD) \xrightarrow{spatial\ filtering} h_{\textit{eff}}(\tau).$$

Figure 5:
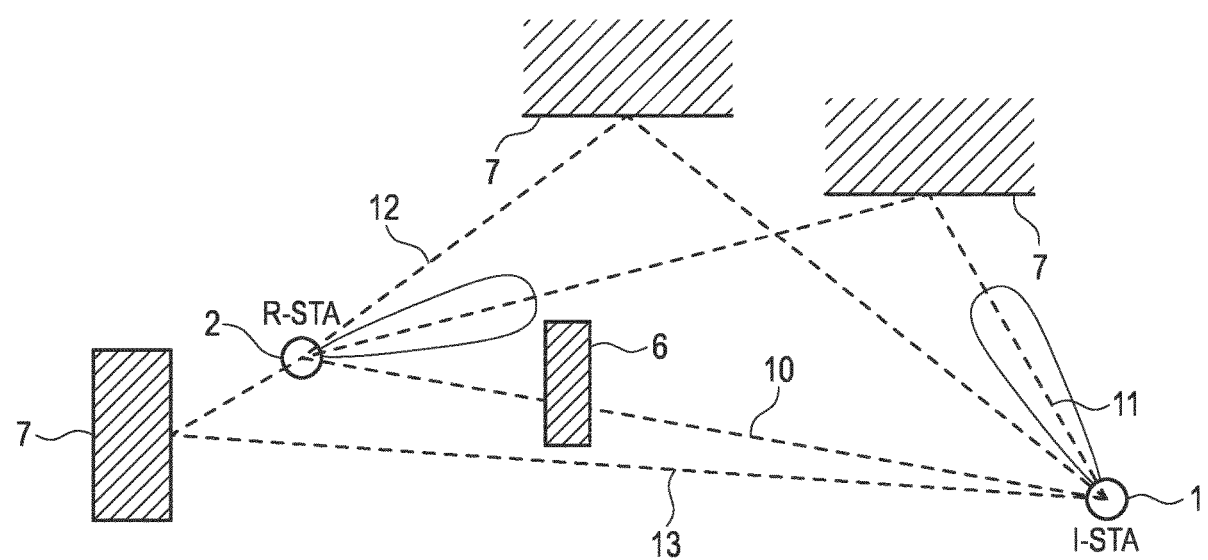
FIG. 5 shows a diagram illustrating a NLOS scenario with four propagation paths with beamforming with respect to a particular path.

This is illustrated in FIG. 5 showing beamforming with respect to the second path 11, which is the selected beamforming path in this case. In contrast to the omnidirectional case shown in FIG. 4, now both STAs 1 and 2 observe the effective CIR after beamforming is applied. Other paths 10, 12 and 13 than the selected path 11, i.e. refused paths, are attenuated by beamforming.

Figure 6A:
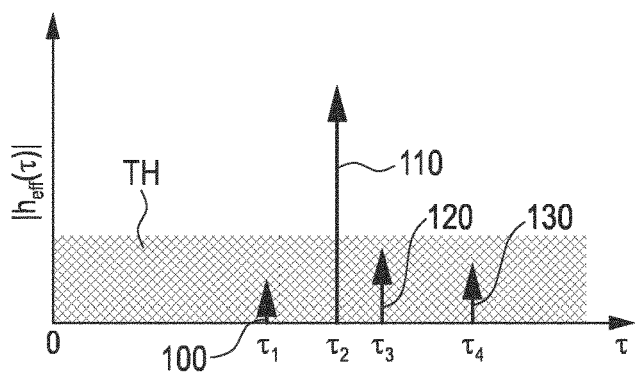
FIG. 6 shows a diagram illustrating four potential CIRs for the scenario depicted in FIG. 5.
Figure 6B:
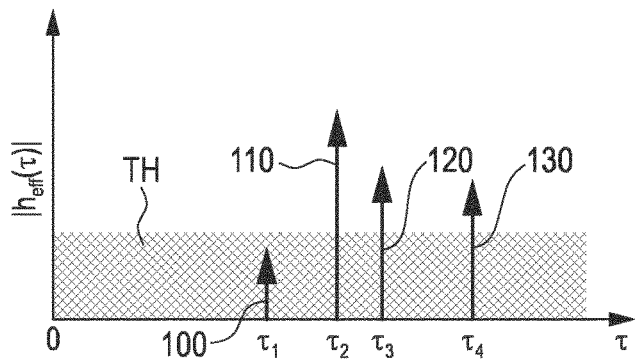

Depending on detailed parameters of the scenario, four different cases may exist, as visualized in FIG. 6. Taps below the threshold TH (or noise floor) have weaker signal strength than the noise and therefore cannot be detected by the FTM measurement procedure. FIG. 6 particularly depicts four potential effective CIRs when beamforming is applied with respect to the selected path 11. FIG. 6A shows the case that a single tap 110 remains after a beamforming procedure. FIGS. 6B to 6D show cases in which multiple taps remain:

In the case shown in FIG. 6B the selected path 11 corresponds to the first remaining tap 110. In the case shown in FIG. 6C the selected path 11 corresponds to the strongest tap 110. In the case shown in FIG. 6D the selected path 11 corresponds neither to first tap (which is tap 100) nor to strongest tap (which is tap 120). Embodiments of the present disclosure allow a valid FTM measurement in most or all of these situations.

Figure 7:
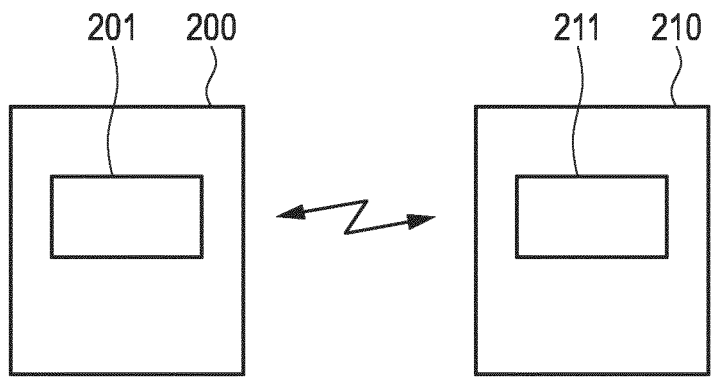
FIG. 7 shows a schematic diagram of a first embodiment of a communication device according to the present disclosure.

One aspect of the present invention relates to a communication device 200, as shown in FIG. 7, which may generally be the I-STA or R-STA, for RF based communication with another communication device 210. The communication device 200 comprises circuitry 201 (e.g. a processor or computer or dedicated hardware) that is configured to apply an FTM procedure and to apply the steps of a communication method illustrated in the flow chart depicted in FIG. 8. The other communication device preferably has corresponding circuitry 211, which is at least able to perform an FTM procedure with the communication device 200.

Figure 8:
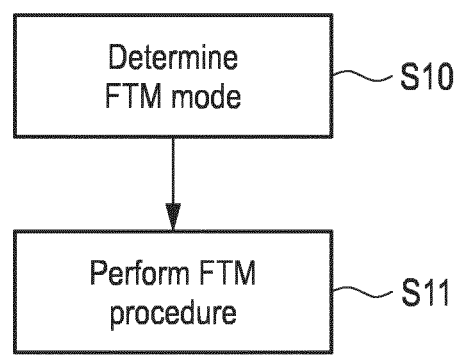
FIG. 8 shows a flow chart of a first embodiment of a communication method according to the present disclosure.

As shown in FIG. 8, in a first step S10 an FTM mode out of at least two different FTM modes is determined. In a second step S11 an FTM procedure to determine the RTT between the communication device 200 and the other communication device 210 is performed. This is done by evaluating a time information of a tap of the channel impulse response, wherein the tap used for the evaluation depends on the determined FTM mode.

For example, an FTM mode may in one embodiment indicate a particular parameter set to be used by the FTM procedure, or it may select a certain FTM procedure which was initialized with a particular parameter set. Such a particular parameter set may inter alia include a parameter selecting a specific tap of the channel response (in other words, a parameter with a specific TOA definition) and, preferably, a parameter selecting a specific AWV. In these embodiments, each of the different FTM modes would relate to a parameter set including a different TOA definition or, in one embodiment, a different combination of TOA definition and AWV.

For instance, TOA and TOD of messages exchanged with the other communication device 210 may be determined. The determined RTT (and/or the determined TOA and TOD) may then e.g. be used for position estimation of the position of the communication device 200 and/or the other communication device 210, by extracting the TOF information from TOA and TOD time stamps.

Figure 14:
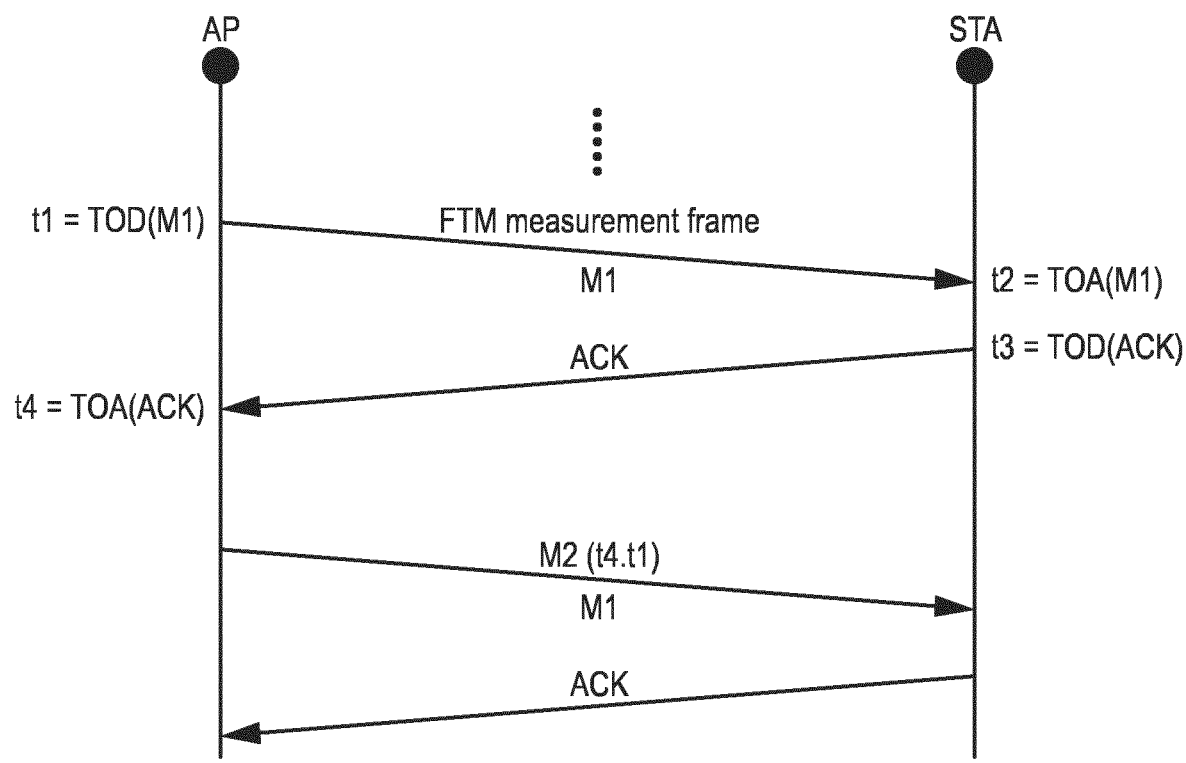
FIG. 14 shows a diagram illustrating an FTM exchange procedure as used according to an aspect of the present disclosure.

FIG. 14 shows a diagram illustrating an FTM exchange procedure (in this example between an Access Point AP and a station STA) as used as part of the FTM procedure according to an aspect of the present disclosure. With this procedure the round trip time (RTT) between the two communication device (AP and STA) can be measured. According to the procedure, after the STA initiates the FTM (not shown in FIG. 14), the AP sends M1 at $t_1$ which is received at $t_2$. The STA sends ACK at $t_3$ which is received at $t_4$. The AP sends $t_4$ and $t_1$ to the STA. Finally, the STA computes time of flight (TOF)

$$TOF = \frac{RTT}{2} = \frac{(t_4 - t_1) - (t_3 - t_2)}{2}$$

which can be used for trilateration.

There are different options to determine the FTM mode. One option is to determine the FTM mode based on at least one of a received FTM signaling information or a recognition of a predetermined condition (e.g. a protocol flag, capability, FTM request parameters, etc.) or an analysis of the channel impulse response or the capabilities of the communication device 200 and/or the other communication device 210 or a standard (e.g. IEEE802.11ay or 802.11az) implemented by the communication device 200. According to another option the FTM mode is selected from among a group of FTM modes, each indicating a different FTM procedure from among a group of FTM procedures including a first path FTM procedure, in which the first tap is used for the evaluation, and a best path FTM procedure, in which the strongest tap is used for the evaluation. Hereby, the FTM mode indicating the first path FTM procedure may be selected if the FTM mode indicating the best path FTM procedure is not supported by the communication device 200 or the other communication device 210 (or if the communication device 200 and/or the other communication device 210 is a legacy communication device). The group of FTM procedures may further include a selected path FTM procedure in which an arbitrary selected tap (e.g. the second or third strongest tap, or the second or third tap by time index) is used for the evaluation. According to an embodiment FTM frames may be transmitted with different AWVs and beamforming training blocks may be appended, by which AOA and AOD measurements can be made.

In an embodiment different antenna weight vectors may be determined for weighting antenna signals transmitted by different antennas of an antenna array used for transmitting a message. An antenna weight vector may be determined based on the determined FTM mode.

In another embodiment the FTM mode may be determined based on a received FTM mode signaling included in a trigger field of an FTM Request action frame.

Generally, the default FTM procedure is first path FTM (also called single tap FTM), which intends to measure the shortest RTT. The receiver's signal processing circuit is configured to detect the TOF of the first tap above the sensitivity threshold. When evaluating the scenarios shown in FIG. 6, this procedure leads to valid results in the cases shown in FIGS. 6A and 6B. In the case of FIG. 6A all other taps 100, 120, 130 than the tap 110 corresponding to the selected path 11 are attenuated by beamforming below the noise floor. Consequently, there is only a single tap 110 left over after beamforming, allowing measuring the RTT of the selected path 11. In the case of FIG. 6B, attenuation of all refused paths below noise floor is not possible, but at least the first path 10 (all earlier paths than tap 110) could be attenuated such that the first detectable tap 110 corresponds to the selected path 11, resulting in measurement of a valid RTT when the first path FTM on the first detectable tap 110 is performed.

Figure 6C:
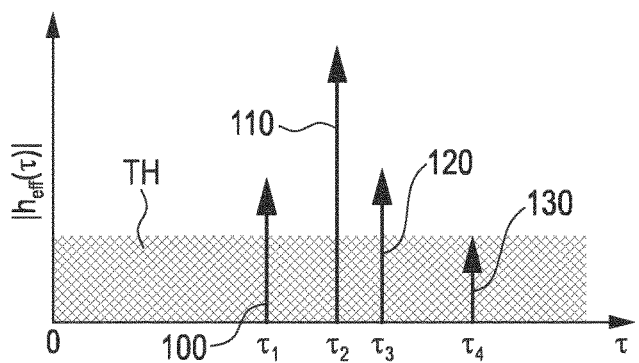
Figure 6D:
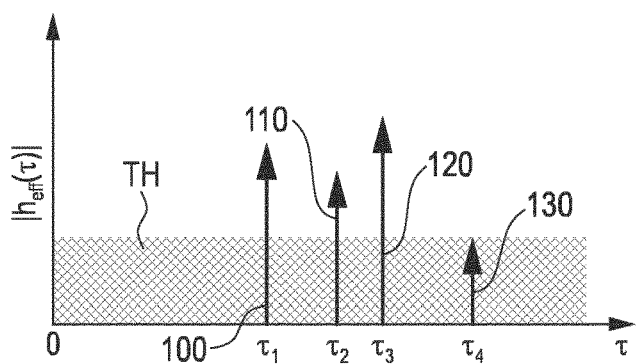

For the remaining two cases shown in FIGS. 6C and 6D, RTT measurement of the selected path is not possible, when FTM is performed with respect to the first detectable tap. Therefore, the first path FTM procedure is extended according to an embodiment of the present disclosure.

To resolve the case shown in FIG. 6C, the FTM procedure may be modified (and a corresponding modified (multi-tap) FTM procedure may be performed) to evaluate the TOF $\tau_{meas}$ of the tap contributing most power to the CIR (110 in FIG. 6C), instead of the TOF of the first tap (100 in FIG. 6C). This modified FTM procedure is called best path FTM (or Strongest Tap FTM). It results in $$\tau_{TOA} = \tau_{i_{max}}$$

with the CIR defined by $$h_{\mathit{eff}}(\tau) = \Sigma_i\ \delta_i(\tau - \tau_i) \cdot \alpha_i \text{ and } i_{max} = \underset{i}{\operatorname{argmax}}\ |\alpha_i|^2.$$

Even when beamforming is applied, multiple taps stronger than the sensitivity threshold might remain in the effective CIR. If the selected path for FTM does not correspond to the first tap, a decision may be made in order to perform FTM on the selected path (called selected path FTM). FIG. 9 illustrates such a situation (in which not only the actual taps 100, 110, 120, 130 are shown, but also two echoes per path). In particular, based on the case shown in FIG. 6D, a CIR is shown with single paths spread into overlapping clusters of taps, complicating the challenge to estimate TOF of the selected path.

Figure 9A:
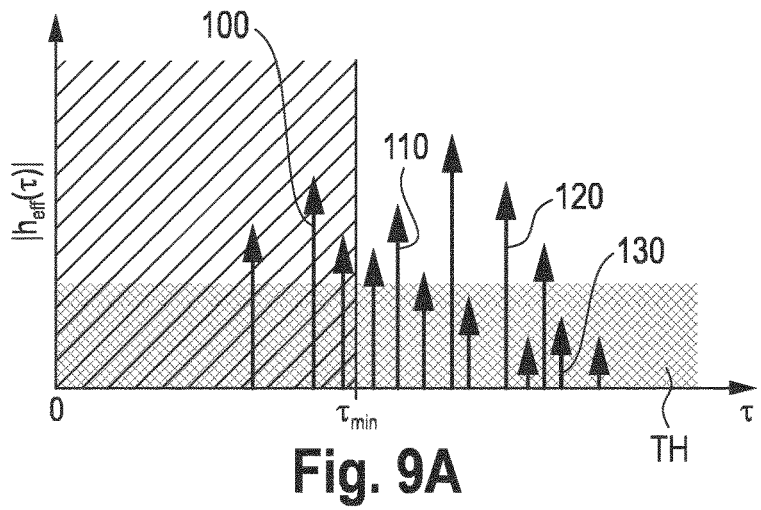
FIG. 9 shows a schematic diagram illustrating a selected path FTM procedure.

The first path FTM procedure described above would result in incorrect FTM results. This can be resolved by specification of a configurable waiting period $\tau_{min}>0$, during which the receiver ignores arriving radio signals. For the remaining period $\tau \geq \tau_{min}$, a modified FTM procedure is performed by searching either for the first tap (called first path FTM) or the strongest tap (also called strongest path FTM), as illustrated in FIG. 9A.

Figure 9B:
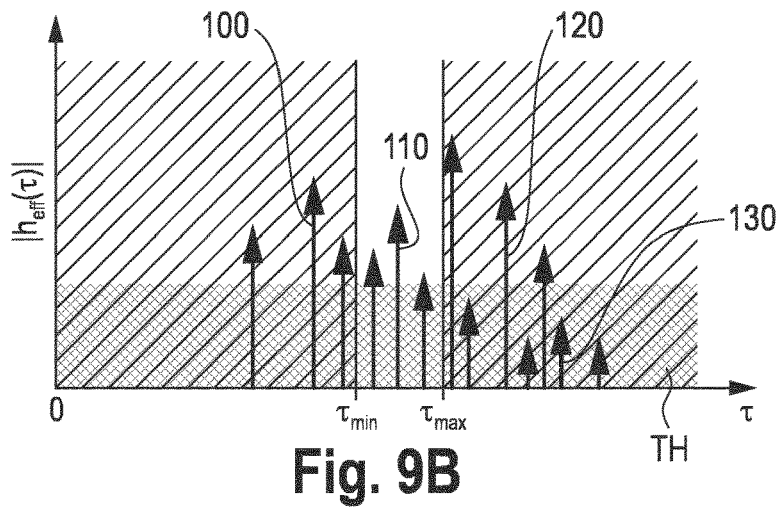
Figure 9C:
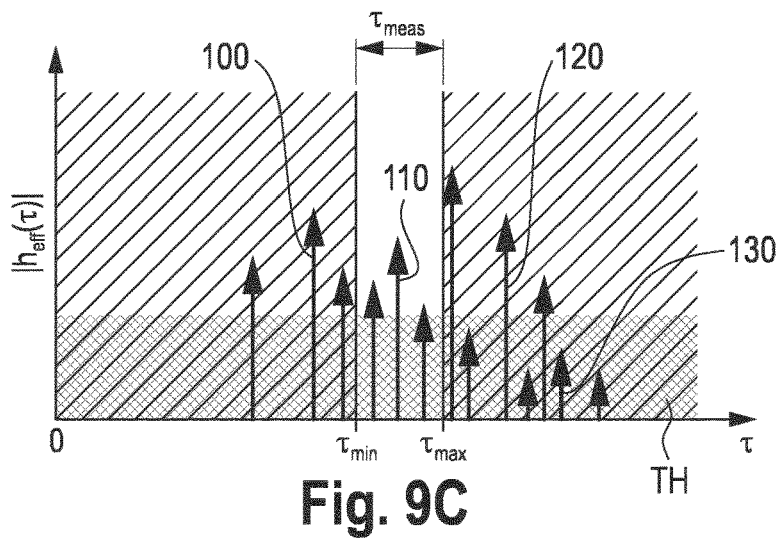

This approach can be extended by additionally specifying an interval of interest in absolute manner, according to which $\tau_{max}>\tau>\tau_{min}$ (as shown in FIG. 9B), or in relative manner according to which $(\tau_{min}+\tau_{meas})>\tau>\tau_{min}$ (as shown in FIG. 9C). The parameters $\tau_{min}$, $\tau_{max}$ and $\tau_{meas}$ respectively, defining the respective interval may be estimated in advance, e.g. by beamforming training, and then signaled to the respective other communication device.

According to an embodiment indirect FTM measurement may be performed, according to which the first path FTM procedure is performed, but a specific tap delay is estimated and added to the TOF of the first tap.

According to another embodiment multi-tap beamforming may be applied, according to which beamforming is applied so that multiple taps are detectable. This allows using the selected tap FTM procedure. If the first tap is not detectable, tap selection by delay-range is not possible.

According to another embodiment selection of a tap may be performed by signaling an index of a correlation peak. The correlation signal is calculated by correlating a known training/synchronization sequence, such as a Golay sequence, with the received signal. Index signaling may then be performed to select a specific path to be used for TOA measurements.

According to another embodiment a threshold value might be defined on top of the physically caused threshold (which is depicted in FIGS. 3, 4, 6 and 9) in order to ignore weak taps. The threshold TH may be defined relative to the strongest tap.

FIG. 10 shows a table illustrating an embodiment of signaling for use with the disclosed FTM procedure. For instance, the Fine Timing Measurement Parameters field may be modified to include an indicator, as bit B7 in this example, requesting an FTM procedure measuring FTM with respect to the first tap (e.g. when B7 is set to 0) and measuring FTM shall with respect to the strongest tap (e.g. when B7 is set to 1).

FIG. 15 shows a table illustrating another embodiment of signaling for use with the disclosed FTM procedure. In this embodiment the FTM Request action field is modified. If a communication device performs an FTM exchange that might require AOA or AOD measurements as defined, the trigger field is set to 1 in the FTM Request initiating the exchange. If AOA or AOD measurements are requested, the best path AWV settings shall be used in transmission and reception of FTM and ACK frames sent by the ISTA and RSTA during the FTM burst. If the trigger field is set to 2, the first path AWV settings shall be used in transmission and reception of FTM and ACK frames sent by the ISTA and RSTA during the FTM burst.

In the following another embodiment of a communication device for RF based communication with another communication device will be described. The communication device may generally be configured like the communication device 200 (or 210) shown in FIG. 7 and comprises circuitry 201 (or 211) that is configured to determine a time of flight of RF signals exchanged with the other communication device via two or more paths.

For instance, the circuitry 201 (or 211) may be configured to apply an FTM procedure. In this embodiment the FTM procedure is performed by exchanging RF signals via two or more paths with the other communication device 210 to determine for said two or more paths the respective time of flight of exchanged RF signals, i.e. there are two or more paths as e.g. shown in FIG. 5 between the two communication devices 200, 210 (represented in these figures by the I-STA 1 and the R-STA 2). The circuitry 201 (and/or 211) is configured to apply the steps of a communication method illustrated in the flow chart depicted in FIG. 11.

Figure 11:
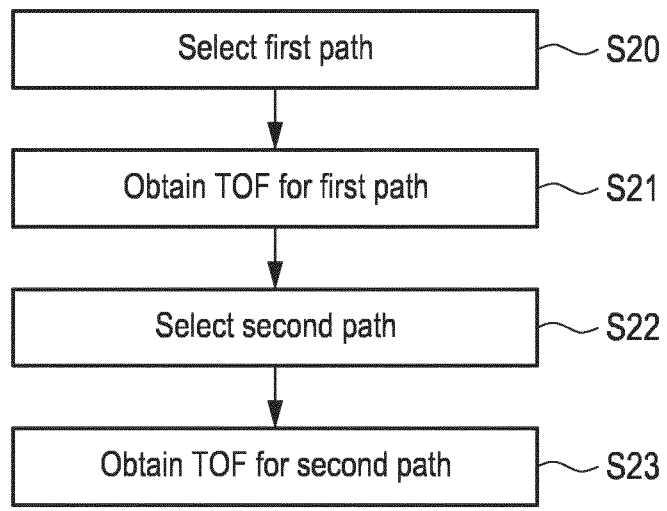
FIG. 11 shows a flow chart of a second embodiment of communication method according to the present disclosure.

As shown in FIG. 11, in a first step S20 a first path of said two or more paths is selected by determining the first tap among the taps of the channel impulse responses of said two or more paths 10, 11, 12, 13 and selecting the path corresponding to the first tap as the first path. For instance, referring to the scenario shown in FIGS. 5 and 6D, the first tap 100 (above the sensitivity threshold TH) is determined and the corresponding path 10 is selected as the first path.

In a second step S21 the time of flight for said first path is obtained. For instance, an FTM procedure may be performed via said first path 10 to obtain the time of flight for said first path.

In a third step S22 a second path of said two or more paths 10, 11, 12, 13 is selected by determining another tap among the taps of the channel impulse responses of said two or more paths, wherein the other tap is different from said first tap 100, and the path corresponding to the other tap is selected as the second path. For instance, referring again to the scenario shown in FIGS. 5 and 6C, in one embodiment the strongest tap 110 is determined and the corresponding path 11 is selected as the second path. In another embodiment another tap is selected by use of a method described above with reference to FIG. 9, i.e. by use of a waiting period (FIG. 9A) or an interval (FIGS. 9B and 9C), so that e.g. the tap 110 and the corresponding path 11 can be selected as second path.

In a fourth step S23 the time of flight for said second path is obtained. For instance, an FTM procedure may be performed via said second path (e.g. path 10 or 12) to obtain the time of flight for said second path.

The method described in FIG. 11 may be continued by selecting and using further paths. The obtained time of flight information may e.g. be used for position estimation of the (relative or absolute) position of the communication device 200 and/or 210. Further, it shall be noted that the step S20 to S23 may also be performed in a reversed order, according to which step S22 is followed by step S23, which is then followed by step S20 followed by step S21.

Figure 12:
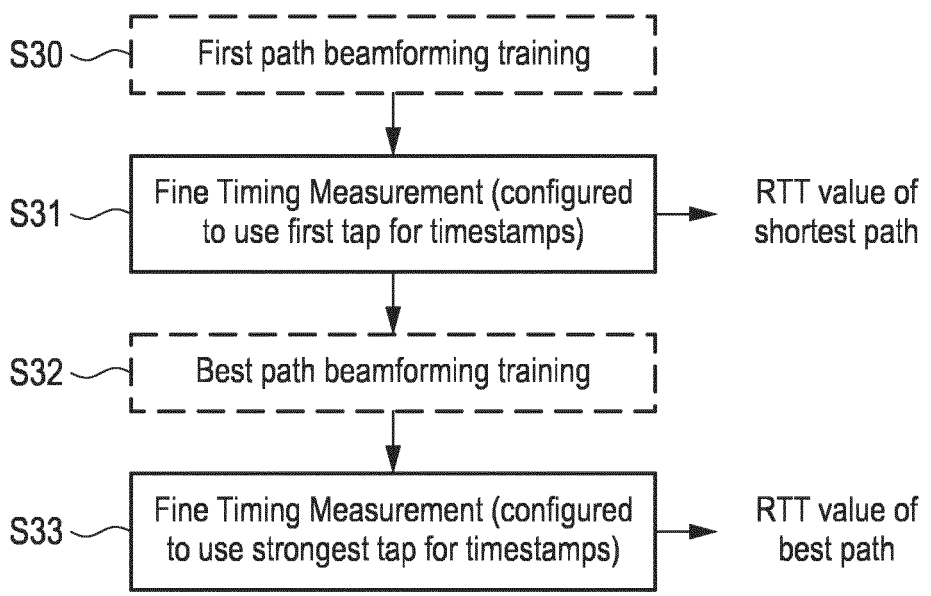
FIG. 12 shows a flow chart of a third embodiment of communication method according to the present disclosure.

Another embodiment of a communication method according to the present disclosure is illustrated in the flow chart depicted in FIG. 12. In a first step S30 first path beamforming training is performed. The first path (corresponding to the first tap) is used in the second step S31 to perform the FTM procedure to obtain the RTT of the shortest path. In a third step S32 best path beamforming training is performed. The best path (corresponding to the strongest tap) is used in the fourth step S33 to perform the FTM procedure to obtain the RTT of the best path.

Figure 13:
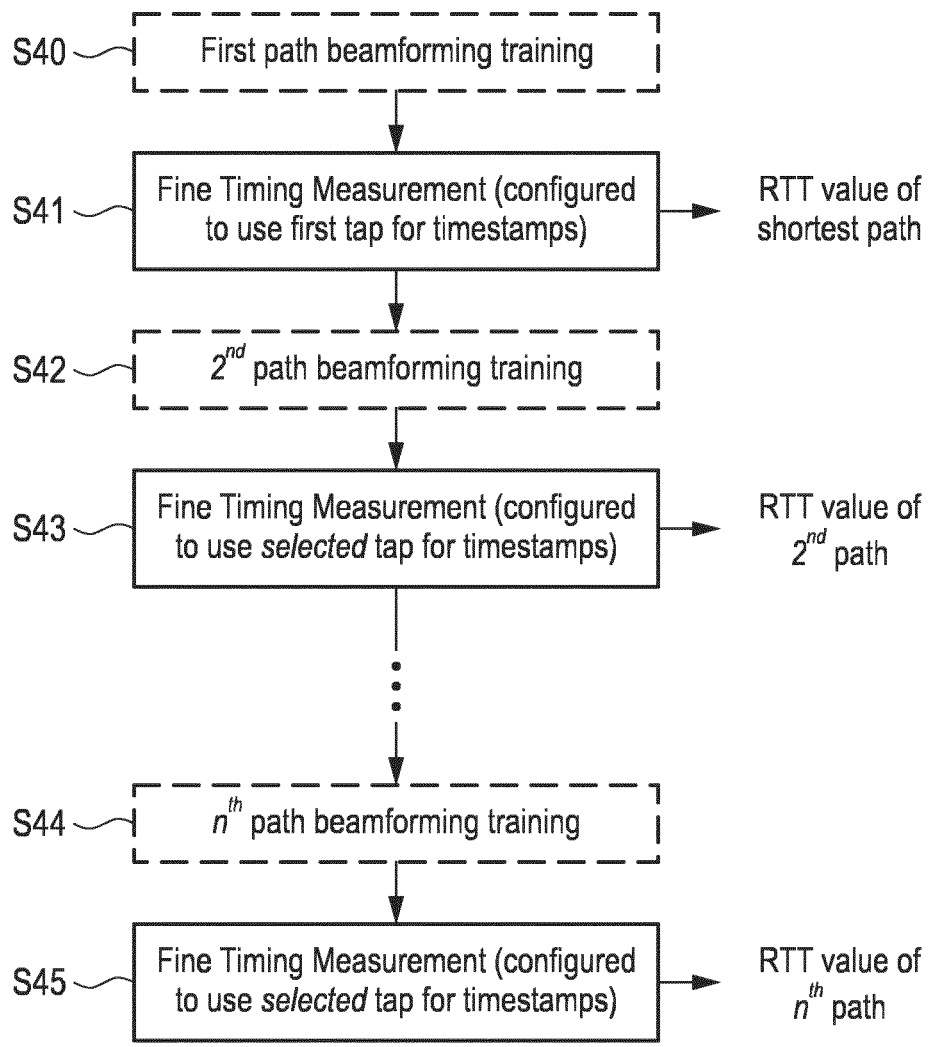
FIG. 13 shows a flow chart of a fourth embodiment of communication method according to the present disclosure.

Another embodiment of a communication method according to the present disclosure is illustrated in the flow chart depicted in FIG. 13. The first and second steps S40-S41 correspond to first and second steps S30-S31 of the communication method illustrated in FIG. 12. In a third step S42 second path beamforming training is performed. The second path (corresponding to a selected tap, which can be the strongest tap, but can also be another selected tap) is used in a fourth step S43 to perform the FTM procedure to obtain the RTT of the selected path. The third and fourth steps S42-S43 may be repeated one or more times (generally n times; indicated by steps S44-S45), wherein in each iteration another tap is selected and another path is used in the FTM procedure. This further improves the amount of time of flight information (or corresponding RTT values) so that the accuracy of a subsequent processing, e.g. the estimation of a position, can be improved.

The disclosed solutions are well suited to be adopted by further 802.11ay products because they fit the proposed architecture for the future 802.11ay or 802.11az standard in which respective antenna configurations are employed and because they require only slight modifications to the requirements specification of the 802.11az standard. Compared to the current proposals for FTM, they do not require the first tap in the CIR to be the one corresponding to the selected path. This allows to use RTT information of multiple taps for the purpose of positioning, increasing the accuracy of such methods.

According to embodiments of the disclosure FTM may be performed with respect to the strongest tap (e.g. in conjunction with "best path" beamforming) instead of or in addition to FTM performed with respect to the first tap. Selection schemes for performing FTM with respect to a specific tap n CIR are provided. Further, respective signaling schemes to signal capabilities and request FTM procedure with respective modes are provided.

The disclosed embodiments may further be used in applications apart from those mentioned above, such as communication systems that use another other physical layer than that of wireless communication. More specifically, the disclosed embodiments are not limited to the use of directive communications (via beamforming) with mmWave electromagnetic waves in free space, or electromagnetic waves in general. These applications may include wired networks such as field bus systems, optical communications via optical fibers, optical wireless communication or communication with acoustic waves. In those applications, the measured RTT values may not directly correspond to reflections in a three-dimensional space such as a room, but instead result to from the underlying network topology or reflection properties, e.g. impedance mismatch in case of a cable network. Precise measurement of multiple RTT values using the disclosed embodiments may be used to precisely estimate network properties like topology (e.g., for smart metering), monitor physical states or may further be useful to enhance performance of communication e.g. by pre-distortion of sent signals to mitigate multipath effects. In the acoustical domain, arrays of speakers or microphones can also allow for precise angular estimation to locate a source or a reflector. The disclosed embodiments allow to estimate RTT of acoustic waves via LOS or NLOS paths.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A communication device for RF based communication with another communication device, said communication device comprising circuitry configured to apply a fine timing measurement, FTM, procedure, wherein the circuitry is configured to
    determine an FTM mode out of at least two different FTM modes,
    perform an FTM procedure to determine the round trip time, RTT, between the communication device and the other communication device, wherein the RTT is determined by evaluating a time information of a tap of the channel impulse response, wherein the tap used for the evaluation depends on the determined FTM mode.
2. The communication device as defined in any one of the preceding embodiments, wherein the circuitry is configured to determine the FTM mode based on at least one of a received FTM signaling information or a recognition of a predetermined condition or an analysis of the channel impulse response or the capabilities of the communication device and/or the other communication device or a standard implemented by the communication device.
3. The communication device as defined in any one of the preceding embodiments, wherein the circuitry is configured to determine the FTM mode from among a group of FTM modes, each indicating a different FTM procedure from among a group of FTM procedures including a first path FTM procedure in which the first tap is used for the evaluation and a best path FTM procedure in which the strongest tap is used for the evaluation.
4. The communication device as defined in embodiment 3,
wherein the circuitry is configured to select the FTM mode indicating the first path FTM procedure if the FTM mode indicating the best path FTM procedure is not supported by the communication device or the other communication device.
5. The communication device as defined in embodiment 3 or 4,
wherein the group of FTM procedures further includes a selected path FTM procedure in which a selected tap is used for the evaluation.
6. The communication device as defined in any one of the preceding embodiments, further comprising beamforming circuitry configured to perform beamforming for the FTM procedure using an Antenna Weight Vector, AWV, which is selected based on the FTM mode.
7. The communication device as defined in any one of the preceding embodiments, wherein the circuitry is configured to determine and/or apply different antenna weight vectors for weighting antenna signals transmitted or received by different antennas of an antenna array used for transmitting or receiving a signal.
8. The communication device as defined in any one of the preceding embodiments, wherein the circuitry is configured to determine and/or apply an antenna weight vector based on the determined FTM mode.
9. The communication device as defined in any one of the preceding embodiments, wherein the circuitry is configured to determine the FTM mode based on a received FTM mode signaling included in a trigger field of an FTM Request Action field.
10. The communication device as defined in any one of the preceding embodiments, wherein the circuitry is configured to determine the FTM mode based on a received FTM mode signaling included in a Fine Timing Measurement Parameters field of a Fine Timing Measurement Parameters element.
11. A communication method of a communication device for RF based communication with another communication device, said communication method being configured to apply a fine timing measurement, FTM, procedure, wherein the communication method comprises
    determining an FTM mode out of at least two different FTM modes,
    performing an FTM procedure to determine the round trip time, RTT, between the communication device and the other communication device, wherein the RTT is determined by evaluating a time information of a tap of the channel impulse response, wherein the tap used for the evaluation depends on the determined FTM mode.
12. A communication device for RF based communication with another communication device, said communication device comprising circuitry configured to determine a time of flight of RF signals exchanged with the other communication device via two or more paths, wherein the circuitry is configured to
  select a first path of said two or more paths by determining the first tap among the taps of the channel impulse responses of said two or more paths and selecting the path corresponding to the first tap as the first path,
  obtain the time of flight for said first path,
  select a second path of said two or more paths by determining another tap among the taps of the channel impulse responses of said two or more paths, wherein the other tap is different from said first tap, and selecting the path corresponding to the other tap as the second path, and
  obtain the time of flight for said second path.
13. The communication device as defined in embodiment 12,
wherein the circuitry is configured to select the second path by determining the strongest tap among the taps of the channel impulse responses of said two or more paths and to select the path corresponding to the strongest tap as the second path.
14. The communication device as defined in embodiment 12,
wherein the circuitry is configured to select the second path by determining the first tap among the taps of the channel impulse responses of said two or more paths after a predetermined delay and to select the path corresponding to the first tap after said predetermined delay as the second path.
15. The communication device as defined in embodiment 12,
wherein the circuitry is configured to select the second path by determining the first tap among the taps of the channel impulse responses of said two or more paths within a time window and to select the path corresponding to the first tap within said time window as the second path.
16. The communication device as defined in embodiment 12,
wherein the circuitry is configured to select the second path by determining the strongest tap above the sensitivity threshold among the taps of the channel impulse responses of said two or more paths within a time window and to select the path corresponding to the strongest tap within said time window as the second path.
17. The communication device as defined in embodiment 12,
wherein the circuitry is configured to select the second path by determining the tap among the taps of the channel impulse responses of said two or more paths to perform an FTM procedure via said second path by signaling an index.
18. The communication device as defined in embodiment 17,
wherein the index selects a tap among the taps of the channel impulse responses of said two or more paths sorted by the tap's magnitude.
19. The communication device as defined in embodiment 17,
wherein the index selects a tap among the taps of the channel impulse responses of said two or more paths sorted by the tap's delay.

20. The communication device as defined in any one of embodiments 12 to 19,
wherein the circuitry is configured to obtain the time of flight for said first path by performing an FTM procedure via said first path and/or to obtain the time of flight for said second path by performing an FTM procedure via said second path.
21. The communication device as defined in embodiment 20,
further comprising signaling circuitry configured to generate FTM signaling information indicating that the communication device is configured to perform an FTM procedure via said second path.
22. The communication device as defined in embodiment 21,
wherein the signaling circuitry is configured to generate FTM signaling information indicating if the communication device is configured to perform an FTM procedure via a path corresponding to the strongest tap as said second path and/or indicating to which tap the path selected as the second path corresponds.
23. The communication device as defined in embodiment 21 or 22,
wherein the signaling circuitry is configured to include the FTM signaling information into an Extended Capabilities Field or a Fine Timing Measurement Parameters Field.
24. The communication device as defined in any one of embodiments 12 to 23, further comprising position estimation circuitry configured to determine the position of the communication device based on the times of flight of the first and second paths.
25. The communication device as defined in embodiment 24,
wherein the position estimation circuitry is configured to additionally use angle information for the first and second paths, the angle information indicating the angle of departure and the angle of arrival of an RF signal exchanged via the respective path, for determining the position of the communication device.
26. The communication device as defined in embodiment 20,
further comprising beamforming circuitry configured to perform beamforming on a selected path before performing the FTM procedure via said path.
27. A communication method for RF based communication with another communication device, said communication method comprising a method configured to determine a time of flight of RF signals exchanged with the other communication device via two or more paths comprising
  selecting a first path of said two or more paths by determining the first tap among the taps of the channel impulse responses of said two or more paths and selecting the path corresponding to the first tap as the first path,
  obtaining the time of flight for said first path,
  selecting a second path of said two or more paths by determining another tap among the taps of the channel impulse responses of said two or more paths, wherein the other tap is different from said first tap, and selecting the path corresponding to the other tap as the second path, and
  obtaining the time of flight for said second path.
28. The communication device as defined in any one embodiments 1 to 10 or 12 to 26, further comprising antenna circuitry comprising one or more antenna elements for transmitting and receiving RF signals.

29. The communication device as defined in any one embodiments 1 to 10 or 12 to 26, wherein the communication device is configured for communicating with the other communication device in the 60 GHz frequency band.

30. A non-transitory computer-readable recording medium that stores therein a computer program product, which, when executed by a processor, causes the method according to claim 11 or 27 to be performed.

31. A computer program comprising program code means for causing a computer to perform the steps of said method according to embodiment 11 or 27 when said computer program is carried out on a computer.

The invention claimed is:

1. A communication device for radio frequency (RF) based communication with a second communication device, said communication device comprising circuitry configured to apply a fine timing measurement (FTM) procedure, wherein the circuitry is configured to
   determine an FTM mode out of at least two different FTM modes, and
   perform an FTM procedure to determine a round trip time (RTT) between the communication device and the second communication device,
   wherein the RTT is determined by evaluating a time information of a single tap of a channel impulse response, wherein the single tap used for the evaluation depends on the determined FTM mode, and
   the at least two FTM modes include a first FTM mode corresponding to a first path FTM procedure in which the single tap is a first tap in the channel impulse response, and a second FTM mode corresponding to a best path FTM procedure in which the single tap is a strongest tap in the channel impulse response.

2. The communication device as claimed in claim 1, wherein the circuitry is configured to determine the FTM mode based on at least one of a received FTM signaling information or a recognition of a predetermined condition or an analysis of the channel impulse response or capabilities of the communication device and/or the second communication device or a standard implemented by the communication device.

3. The communication device as claimed in claim 1, wherein the first FTM mode corresponds to a line of sight path between the communication device and the second communication device, and the second FTM mode corresponds to a non-line of sight path between the communication device and the second communication device.

4. The communication device as claimed in claim 1, wherein the circuitry is configured to select the first FTM mode if the second FTM mode is not supported by the communication device or the second communication device.

5. The communication device as claimed in claim 1, wherein the at least two FTM modes include a third FTM mode corresponding to a selected path FTM procedure in which a selected single tap of the channel impulse response is used for the evaluation.

6. The communication device as claimed in claim 1, further comprising beamforming circuitry configured to perform beamforming for the FTM procedure using an Antenna Weight Vector (AWV) which is selected based on the FTM mode.

7. A communication method of a communication device for radio frequency (RF) based communication with a second communication device, said communication method being configured to apply a fine timing measurement (FTM) procedure, the communication method comprising:
   determining an FTM mode out of at least two different FTM modes, and
   performing an FTM procedure to determine a round trip time (RTT) between the communication device and the second communication device,
   wherein the RTT is determined by evaluating a time information of a single tap of a channel impulse response, wherein the single tap used for the evaluation depends on the determined FTM mode, and
   the at least two FTM modes include a first FTM mode corresponding to a first path FTM procedure in which the single tap is a first tap in the channel impulse response, and a second FTM mode corresponding to a best path FTM procedure in which the single tap is a strongest tap in the channel impulse response.

8. A communication device for radio frequency (RF) based communication with a second communication device, said communication device comprising circuitry configured to determine a time of flight of RF signals exchanged with the second communication device via two or more paths, wherein the circuitry is configured to
   select a first path of said two or more paths by determining a first single tap among a plurality of taps of channel impulse responses of said two or more paths and select a path corresponding to the first tap as the first path,
   obtain the time of flight for said first path,
   select a second path of said two or more paths by determining a second single tap among the plurality of taps of the channel impulse responses of said two or more paths, wherein the second tap is different from said first tap, and select a path corresponding to the second tap as the second path, and
   obtain the time of flight for said second path.

9. The communication device as claimed in claim 8, wherein the circuitry is configured to select the second path by determining a strongest tap among the plurality of taps of the channel impulse responses of said two or more paths and to select a path corresponding to the strongest tap as the second path.

10. The communication device as claimed in claim 8, wherein the circuitry is configured to select the second path by determining the first single tap among the plurality of taps of the channel impulse responses of said two or more paths after a predetermined delay and to select the path corresponding to the first single tap after said predetermined delay as the second path.

11. The communication device as claimed in claim 8, wherein the circuitry is configured to select the second path by determining the first single tap among the plurality of taps of the channel impulse responses of said two or more paths within a time window and to select the path corresponding to the first single tap within said time window as the second path.

12. The communication device as claimed in claim 8, wherein the circuitry is configured to select the second path by determining a strongest tap above a sensitivity threshold among the plurality of taps of the channel impulse responses of said two or more paths within a time window and to select a path corresponding to the strongest tap within said time window as the second path.

13. The communication device as claimed in claim 8, wherein the circuitry is configured to select the second path by determining a single tap among the plurality of taps of the channel impulse responses of said two or more paths to perform an FTM procedure via said second path by signaling an index.

14. The communication device as claimed in claim 8, wherein the circuitry is configured to obtain the time of flight for said first path by performing an FTM procedure via said first path and/or to obtain the time of flight for said second path by performing an FTM procedure via said second path.

15. The communication device as claimed in claim 14, further comprising signaling circuitry configured to generate FTM signaling information indicating that the communication device is configured to perform an FTM procedure via said second path.

16. The communication device as claimed in claim 15, wherein the signaling circuitry is configured to generate FTM signaling information indicating if the communication device is configured to perform an FTM procedure via a path corresponding to a strongest tap as said second path and/or indicate to which tap the path selected as the second path corresponds.

17. The communication device as claimed in claim 8, further comprising position estimation circuitry configured to determine a position of the communication device based on the times of flight of the first and second paths.

18. The communication device as claimed in claim 14, further comprising beamforming circuitry configured to perform beamforming on a selected path before performing the FTM procedure via said path.

19. A communication method for radio frequency (RF) based communication with a second communication device, said communication method comprising a method configured to determine a time of flight of RF signals exchanged with the second communication device via two or more paths comprising:
   selecting a first path of said two or more paths by determining a first single tap among a plurality of taps of channel impulse responses of said two or more paths and selecting a path corresponding to the first tap as the first path,
   obtaining the time of flight for said first path,
   selecting a second path of said two or more paths by determining a second single tap among the plurality of taps of the channel impulse responses of said two or more paths, wherein the second tap is different from said first tap, and selecting a path corresponding to the second tap as the second path, and
   obtaining the time of flight for said second path.

20. A non-transitory computer-readable recording medium that stores therein a computer program product, which, when executed by a processor, causes the method according to claim 7 to be performed.

* * * * *